US011621434B2

(12) United States Patent
Yoo et al.

(10) Patent No.: US 11,621,434 B2
(45) Date of Patent: Apr. 4, 2023

(54) METHOD FOR MANUFACTURING ELECTRODE ASSEMBLY

(71) Applicant: LG CHEM, LTD., Seoul (KR)

(72) Inventors: Mi Jung Yoo, Daejeon (KR); Byung Heon Shin, Daejeon (KR); Woo Yong Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 157 days.

(21) Appl. No.: 16/761,647

(22) PCT Filed: Jan. 24, 2019

(86) PCT No.: PCT/KR2019/001048
§ 371 (c)(1),
(2) Date: May 5, 2020

(87) PCT Pub. No.: WO2020/004759
PCT Pub. Date: Jan. 2, 2020

(65) Prior Publication Data
US 2021/0184243 A1 Jun. 17, 2021

(30) Foreign Application Priority Data
Jun. 29, 2018 (KR) ........................ 10-2018-0075334

(51) Int. Cl.
*H01M 10/04* (2006.01)
*H01M 4/04* (2006.01)

(52) U.S. Cl.
CPC ....... *H01M 10/0468* (2013.01); *H01M 4/043* (2013.01); *H01M 10/0431* (2013.01); *H01M 10/0436* (2013.01); *H01M 10/0463* (2013.01)

(58) Field of Classification Search
CPC ......... H01M 50/463–469; H01M 10/02–0525; H01M 10/058–0587; H01M 4/04–0435
See application file for complete search history.

(56) References Cited

U.S. PATENT DOCUMENTS

| 7,049,028 B2 | 5/2006 | Notten et al. |
| 9,799,926 B2 | 10/2017 | Choi et al. |
| (Continued) | | |

FOREIGN PATENT DOCUMENTS

| CN | 102769146 A | 11/2012 |
| CN | 103959541 A | 7/2014 |
| (Continued) | | |

OTHER PUBLICATIONS

Extended European Search Report for European Application No. 19826608.2, dated Mar. 11, 2021.
(Continued)

*Primary Examiner* — Jonathan Crepeau
*Assistant Examiner* — Jacob Buchanan
(74) *Attorney, Agent, or Firm* — Birch, Stewart, Kolasch & Birch, LLP (57) ABSTRACT

A method for manufacturing the electrode assembly includes: a first step of preparing a plurality of radical units, each of which is manufactured by alternately stacking an electrode and a separator; a second step of stacking the plurality of radical units to manufacture an electrode stack; and a third step of pressing an outer surface of the electrode stack to manufacture an electrode assembly on which a curved surface having a curvature radius is formed on the electrode stack, wherein, when the sum of bonding force remaining after the third step among bonding force between the electrode and the separator as bonding force generated before the third step is defined as F1, the sum of force by which the electrode and the separator are spread again so that shapes of the electrode and the separator return to shapes before the electrode stack is pressed in the third step is defined as R, and the sum of bonding force additionally generated between the electrode and the separator within the (Continued)

electrode assembly by the third step is defined as F2, expression: F1+R≤F2 is satisfied.

17 Claims, 5 Drawing Sheets

(56) References Cited

U.S. PATENT DOCUMENTS

| | | | |
|---|---|---|---|
| 9,837,682 B1 | 12/2017 | Nikkhoo et al. | |
| 10,147,556 B2 | 12/2018 | Uchida et al. | |
| 10,516,185 B2 | 12/2019 | Park et al. | |
| 10,608,215 B2 | 3/2020 | Ju et al. | |
| 2003/0013012 A1* | 1/2003 | Ahn | H01M 10/0565 429/152 |
| 2011/0097615 A1* | 4/2011 | Goh | H01M 10/04 429/94 |
| 2012/0183825 A1* | 7/2012 | Lee | H01M 10/0431 29/623.2 |
| 2013/0108907 A1* | 5/2013 | Bhardwaj | H01M 10/0431 29/623.2 |
| 2014/0212729 A1 | 7/2014 | Park et al. | |
| 2014/0212751 A1 | 7/2014 | Ku | |
| 2014/0242296 A1* | 8/2014 | Motoda | H01M 50/414 523/322 |
| 2014/0272543 A1* | 9/2014 | Devan | H01M 10/0585 429/162 |
| 2014/0377631 A1 | 12/2014 | Park et al. | |
| 2015/0010813 A1 | 1/2015 | Ko et al. | |
| 2015/0113796 A1* | 4/2015 | Han | H01M 10/0436 29/623.1 |
| 2015/0279577 A1 | 10/2015 | Uchida et al. | |
| 2016/0013458 A1* | 1/2016 | Suh | H01M 50/172 429/127 |
| 2016/0268625 A1 | 9/2016 | Choi et al. | |
| 2016/0276635 A1 | 9/2016 | Ju et al. | |
| 2016/0276712 A1* | 9/2016 | Sale | B32B 37/06 |
| 2016/0372783 A1 | 12/2016 | Min et al. | |
| 2017/0309915 A1* | 10/2017 | Lee | H01M 10/052 |
| 2018/0076442 A1* | 3/2018 | Choi | B32B 37/0053 |
| 2018/0254510 A1 | 9/2018 | Cho et al. | |
| 2020/0194763 A1 | 6/2020 | Yoo et al. | |

FOREIGN PATENT DOCUMENTS

| | | | |
|---|---|---|---|
| CN | 103959542 A | 7/2014 | |
| CN | 105229838 A | 1/2016 | |
| CN | 107810563 A | 3/2018 | |
| EP | 2922112 A1 | 9/2015 | |
| EP | 3340333 A1 | 6/2018 | |
| EP | 3660969 A1 | 6/2020 | |
| JP | 2015-201437 A | 11/2015 | |
| JP | 2016-33988 A | 3/2016 | |
| KR | 10-2007-0110566 A | 11/2007 | |
| KR | 10-2013-0103202 A | 9/2013 | |
| KR | 10-2013-0131246 A | 12/2013 | |
| KR | 10-1578367 B1 | 12/2015 | |
| KR | 10-1619950 B1 | 5/2016 | |
| KR | 10-1630513 B1 | 6/2016 | |
| KR | 10-2016-0115357 B1 | 10/2016 | |
| KR | 10-2018-0062874 A | 6/2018 | |
| WO | WO-2016208970 A1 * | 12/2016 | B32B 37/0053 |
| WO | WO-2017090937 A1 * | 6/2017 | H01M 50/20 |

OTHER PUBLICATIONS

International Search Report issued in PCT/KR2019/001048 (PCT/ISA/210), dated May 1, 2019.

* cited by examiner

METHOD FOR MANUFACTURING ELECTRODE ASSEMBLY

CROSS-REFERENCE TO RELATED APPLICATION

The present application claims the benefit of the priority of Korean Patent Application No. 10-2018-0075334, filed on Jun. 29, 2018, which is hereby incorporated by reference in its entirety.

TECHNICAL FIELD

The present invention relates to a method for manufacturing an electrode assembly, and more particularly, to a method for manufacturing an electrode assembly having a curved surface.

BACKGROUND ART

As the demands for electronic devices and the consumer's demands for electronic devices become increasingly diverse, specifications required for secondary batteries that are mounted on the electronic devices and repeatedly chargeable and dischargeable are also diversified. For example, recently, to improve the grip feeling when the user for utilizing the electronic device holds the electronic device by using his/her hand, the electronic device may be required to have a curved shape deviating from the existing angular shape. For this, the secondary battery may also be required to have a curved shape deviating from the existing shape. Alternatively, to maximize the utilization of the internal space of the electronic device, it is required that the shape of the secondary battery has an irregular shape such as the curved shape or the like deviating from the existing regular shape.

To manufacture the secondary battery having the curved shape, it is generally necessary to press an outer surface of an electrode assembly by using a pressing press having a curved surface. However, according to the related art, there have been various problems in the process of pressing the outer surface of the electrode assembly by using the pressing press to form the curved surface.

For example, an electrode and a separator are in a state of being bonded to each other within the electrode assembly before being pressed by the pressing press. Thus, even if the electrode assembly is pressed by the pressing press to form the curved shape, the curved surface may not be maintained due to the bonding force between the electrode and the separator before being pressed by the pressing press, and thus, the curved surface may return to the state before being pressed. This problem tends to become worse as a radius of curvature of the curved surface formed by the pressing press decreases (i.e., as the electrode assembly is more bent by the pressing press).

The above problems have been obstacles to manufacture an electrode assembly, on which a curved surface having a relatively small curvature radius is formed, and a secondary battery.

DISCLOSURE OF THE INVENTION

Technical Problem

Therefore, an object to be solved by the present invention is to manufacture an electrode assembly on which a curved surface having a curvature radius that is relatively less than that of an electrode assembly according to the related art.

Technical Solution

To achieve the above object, according to an aspect of the present invention, a method for manufacturing the electrode assembly includes: a first step of preparing a plurality of radical units, each of which is manufactured by alternately stacking an electrode and a separator; a second step of stacking the plurality of radical units to manufacture an electrode stack; and a third step of pressing an outer surface of the electrode stack to manufacture an electrode assembly having a curved surface having a curvature radius, wherein, after the third step, the following equation is satisfied: $F1+R \leq F2$, wherein F1 is defined as a sum of bonding force remaining after the third step among bonding force between the electrode and the separator as bonding force generated before the third step, wherein R is defined as a sum of force by which the electrode and the separator are spread again so that shapes of the electrode and the separator return to shapes before the electrode stack is pressed in the third step, and wherein F2 is a sum of bonding force additionally generated between the electrode and the separator within the electrode assembly by the third step.

The method may further include a winding step of surrounding at least a portion of a circumference of the electrode stack by using a winding separator that is distinct from the separator constituting the electrode stack to maintain a relative distance between the radical units within the electrode stack, wherein the winding step may be performed between the second step and the third step, and wherein the force F2 may include a sum (e1) of a bonding force between the electrode and the separator within the electrode stack, which is additionally generated in the third step, and a sum (e2) of a bonding force between the electrode stack and the winding separator, which is additionally generated in the third step.

The curvature radius may range from 70 mm to 200 mm.

In the first step, the electrode and the separator may be bonded to each other at a temperature of 30° C. to 70° C.

In the third step, the electrode stack may be pressed at a pressure of 400 kgf/cm² to 800 kgf/cm².

In the third step, the electrode stack may be pressed at a temperature of 60° C. to 100° C.

In the winding step, the winding separator may surround an entire circumference of the electrode stack.

The plurality of radical units may include: a first bi-cell defined by a positive electrode among the electrodes disposed on opposite outermost surfaces of the first bi-cell; and a second bi-cell defined by a negative electrode among the electrodes disposed on opposite outermost surfaces of the second bi-cell, wherein, in the second step, the first bi-cell and the second bi-cell may be alternately stacked, and an insertion separator that is a separate separator from the separators in the radical units may be disposed between adjacent first and second bi-cells.

The first bi-cell may have a structure in which a positive electrode, a separator, a negative electrode, a separator, and a positive electrode are disposed, and the second bi-cell may have a structure in which a negative electrode, a separator, a positive electrode, a separator, and a negative electrode are disposed.

In the second step, first bi-cells may be disposed on opposite outermost surfaces of the electrode stack, and each of the outermost positive electrodes of the first bi-cells disposed on the opposite outermost surfaces of the electrode stack is a single-sided positive electrode on which a positive electrode active material is applied to only one surface of a collector.

In the second step, eight first bi-cells may be provided in the electrode stack, and seven second bi-cells are provided in the electrode stack.

In the third step, an end of the curved surface may have a curvature radius 2 to 8% less than that of a central portion of the curved surface.

To achieve the above object, according to another aspect of the present invention, a method for manufacturing an electrode assembly includes: a first step of preparing a plurality of radical units, each of which is manufactured by alternately stacking an electrode and a separator; a second step of stacking the plurality of radical units to manufacture an electrode stack; a winding step of surrounding at least a portion of a circumference of the electrode stack by using a winding separator that is distinct from the separator constituting the electrode stack to maintain a relative distance between the radical units within the electrode stack; and a third step of pressing an outer surface of the electrode stack to manufacture an electrode assembly having a curved surface having a curvature radius, wherein, in the first step, the electrode and the separator are bonded to each other at a temperature of 30° C. to 70° C., and wherein, in the third step, the electrode stack is pressed at a temperature of 60° C. to 100° C.

The curvature radius may range from 70 mm to 200 mm.

When the radical units are stacked in the second step, a pressure of pressing the radical units may be equal to or less than 10% of a pressure of pressing the electrode stack in the third step.

Advantageous Effects

According to the present invention, the electrode assembly on which the curved surface having the curvature radius that is relatively less than that of the electrode assembly according to the related art, may be manufactured.

MODE FOR CARRYING OUT THE INVENTION

Hereinafter, a structure of an electrode assembly according to the present invention will be described with reference to the accompanying drawings.

Electrode Assembly

Figure 1:
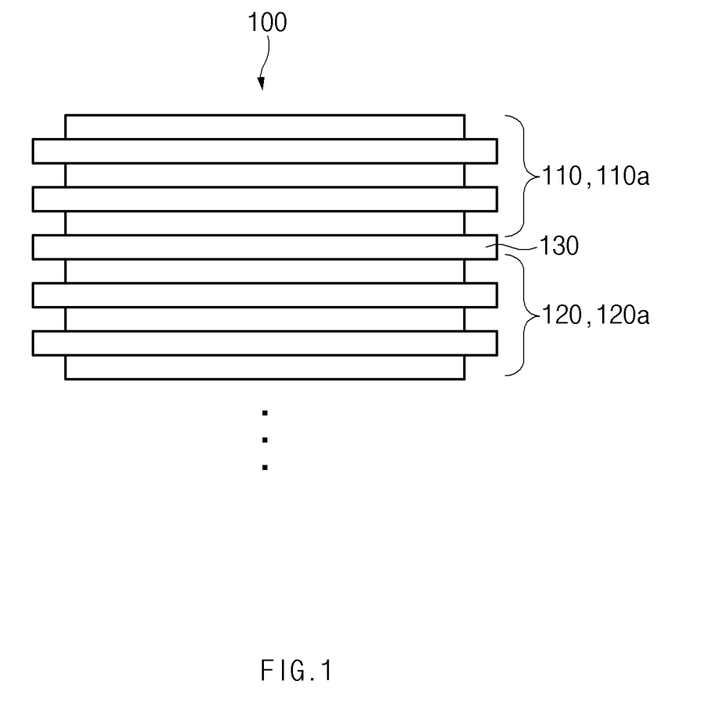
FIG. 1 is a side view illustrating a structure of an electrode stack according to an example of the present invention.
Figure 2:
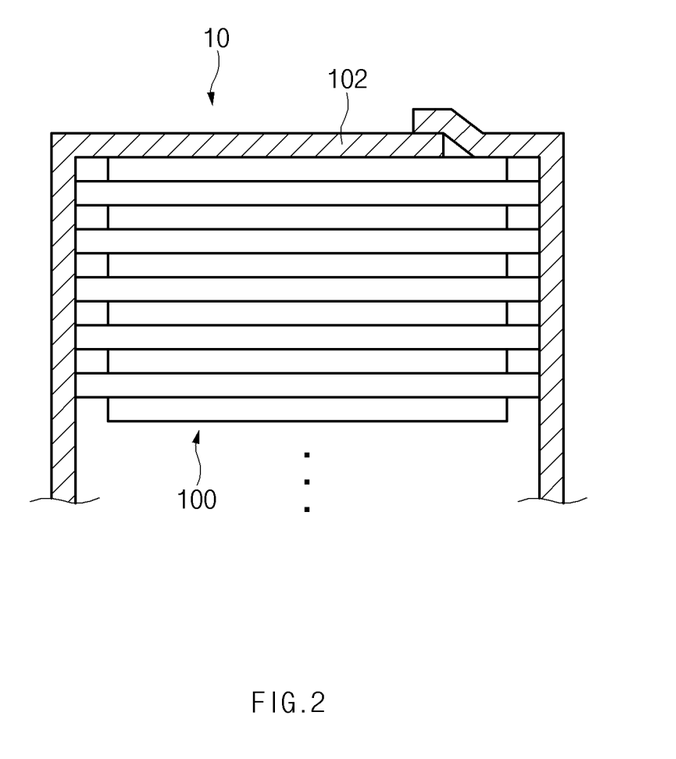
FIG. 2 is a side view illustrating a structure of an electrode assembly before a curved surface is formed according to an example of the present invention.

FIG. 1 is a side view illustrating a structure of an electrode stack according to an example of the present invention, and FIG. 2 is a side view illustrating a structure of an electrode assembly before a curved surface is formed according to an example of the present invention.

Referring to FIGS. 1 and 2, an electrode assembly 10 according to an example of the present invention may include an electrode stack 100 in which a plurality of radical units 110 and 120 are sequentially stacked. The plurality of radical units 110 and 120 may be divided into several types according to a detailed configuration of the radical unit. For example, the plurality of radical units 110 and 120 may be constituted by a first radical unit 110 and a second radical unit 120, which have structures different from each other. In this case, the electrode stack 110 may have a structure in which the first radical unit 110 and the second radical unit 120 are alternately stacked. However, the present invention is not limited thereto. For example, the electrode stack according to an example of the present invention may have a structure in which three kinds or more of radical units are stacked or a structure in which a kind of radical units are stacked.

In this specification, the 'radical unit' may be understood as a constituent including at least one electrode. That is, according to the present invention, the 'radical unit' may be understood not only as a constituent including the electrode and a separator, but also as a constituent including only the electrode.

As illustrated in FIG. 2, the electrode assembly 10 according to an example of the present invention may include a separator 102 surrounding at least a portion of a circumference of the electrode stack 100. Hereinafter, the separator 102 surrounding at least a portion of the circumference of the electrode stack 100 is called a winding separator.

The winding separator 102 may surround the entire circumference of the electrode stack 100. For example, the winding separator 102 may surround the circumference of the electrode stack 100 by one turn, as illustrated in FIG. 2.

Here, 'that the winding separator 102 surrounds the circumference of the electrode stack 100 by one turn' may be understood as that both ends of the winding separator 102 overlap each other so that both the ends of the winding separator 102 are bonded to each other as illustrated in FIG. 2.

Also, 'that the winding separator 102 is capable of surrounding the entire circumference of the electrode stack 100' may not mean that the winding separator 102 surrounds the entire outer surface of the electrode stack 100 to isolate the electrode stack 100 from the outside, but mean that both ends of the winding separator 102 meet each other to be bonded to each other.

The winding separator 102 may be a separator that is separated from the separator constituting the electrode stack 100. That is, the electrode assembly 10 may have a structure in which a separator (i.e., the winding separator) that is separated from the separator within the electrode stack 100 surrounds the circumference of the electrode stack 100.

In the electrode assembly 10 according to an example of the present invention, the radical units constituting the electrode stack 100 may be bi-cells. Hereinafter, the bi-cell will be described.

Figure 3:
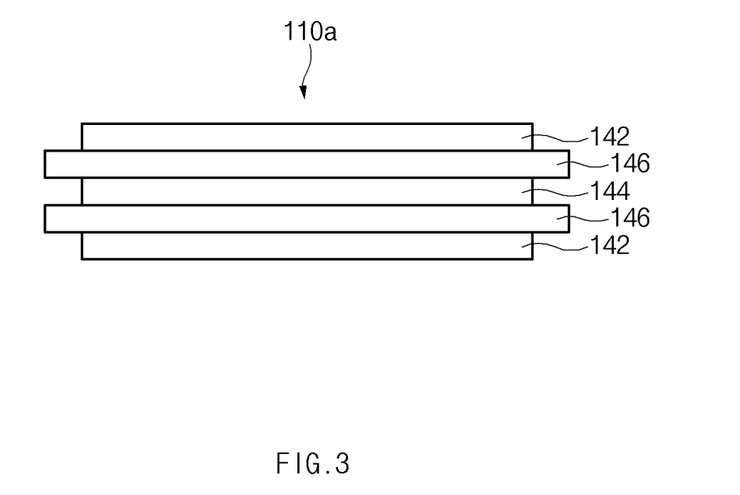
FIG. 3 is a side view of a first bi-cell constituting the electrode assembly according to an example of the present invention.
Figure 4:
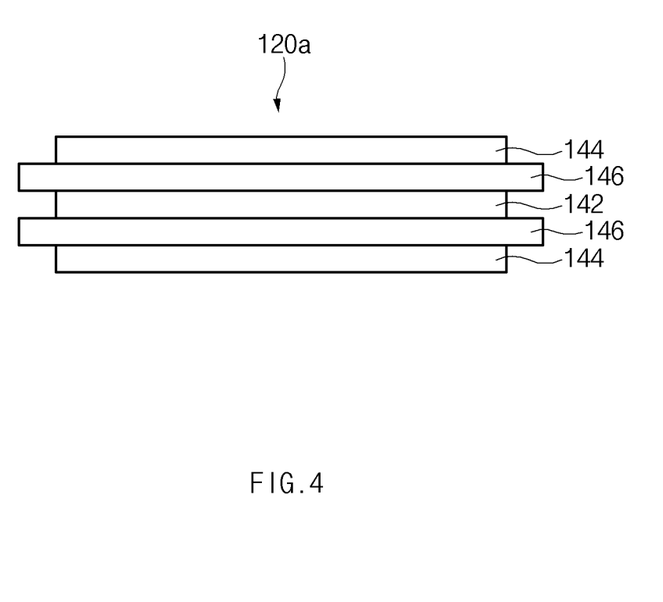
FIG. 4 is a side view of a second bi-cell constituting the electrode assembly according to an example of the present invention.

FIG. 3 is a side view of a first bi-cells constituting the electrode assembly according to an example of the present invention, and FIG. 4 is a side view of a second bi-cells constituting the electrode assembly according to an example of the present invention.

Referring to FIG. 3, a first bi-cell 110a may be a bi-cell having a structure in which a positive electrode is disposed on each of both outermost surfaces. Here, the first bi-cell 110a may have a five-layered structure in which a positive electrode 142, a separator 146, a negative electrode 144, a separator 146, and a positive electrode 142 are sequentially disposed as illustrated in FIG. 3.

Referring to FIG. 4, a second bi-cell 120a may be a bi-cell having a structure in which a negative electrode is disposed on each of both outermost surfaces. Here, the second bi-cell 120a may have a five-layered structure in which a negative electrode 144, a separator 146, a positive electrode 142, a separator 146, and a negative electrode 144 are sequentially disposed as illustrated in FIG. 4.

As described above, the plurality of radical units may be divided into the first radical unit and the second radical unit. Also, the first bi-cell 110a may correspond to the first radical unit, and the second bi-cell 120a may correspond to the second radical unit.

When the radical units are divided into the first bi-call and the second bi-cell, the electrode stack 100 of the electrode assembly 10 according to the present invention may have a structure in which the first bi-cell 110a and the second bi-cells 120a are alternately stacked as illustrated in FIG. 1. Here, when the first bi-cell 110a and the second bi-cell 120a are stacked to directly contact each other, the positive electrode disposed on each of both the outermost surfaces of the first bi-cell and the negative electrode disposed on each of both the outermost surfaces of the second bi-cell may directly contact each other. To prevent this direct contact, as illustrated in FIG. 1, a separate separator 130 may be disposed between the first bi-cell 110a and the second bi-cell 120a. Hereinafter, the separate separator disposed between the first bi-cell 110a and the second bi-cell 120a may be called an 'insertion separator'.

That is, according to an example of the present invention, the electrode stack 100 may have a structure in which the first bi-cell 110a, the insertion separator 130, and the second bi-cell 120a are alternately stacked.

Also, as illustrated in FIG. 1, the first bi-cells 110a may be disposed on all both the outermost surfaces of the electrode stack 100, respectively. That is, the positive electrode disposed on the outermost surface of the first bi-cell 110a may be disposed on all both the outermost surfaces of the electrode stack 100. Also, a single-sided positive electrode on which a positive electrode active material is applied to only one surface of a collector may be disposed on an outer surface of both the outermost surfaces of the first bi-cell 110a, which is disposed on both the outermost surfaces of the electrode stack 100 (i.e., the outermost surface of the electrode stack). Since a portion of the positive electrode disposed on both the outermost surfaces of the electrode stack (in more detail, the positive electrode active material applied to the outside of the collector) does not participate in reaction during charging and discharging, when the single-sided positive electrode is disposed on all both the outermost surfaces of the electrode stack according to an example of the present invention, an electric capacity per unit volume of the electrode stack may increase.

The electrode stack 100 according to an example of the present invention may be provided with eight first bi-cells 110a, seven second bi-cells 120a, and fourteen insertion separators 130 disposed between the first bi-cells 110a and the second bi-cells 120a.

The winding separator 102 may be a separator that is separated from the separator constituting the first bi-cell 110a, the separator constituting the second bi-cell 120a, and the insertion separator 130 disposed between the first bi-cell 110a and the second bi-cell 120a.

Figure 5:
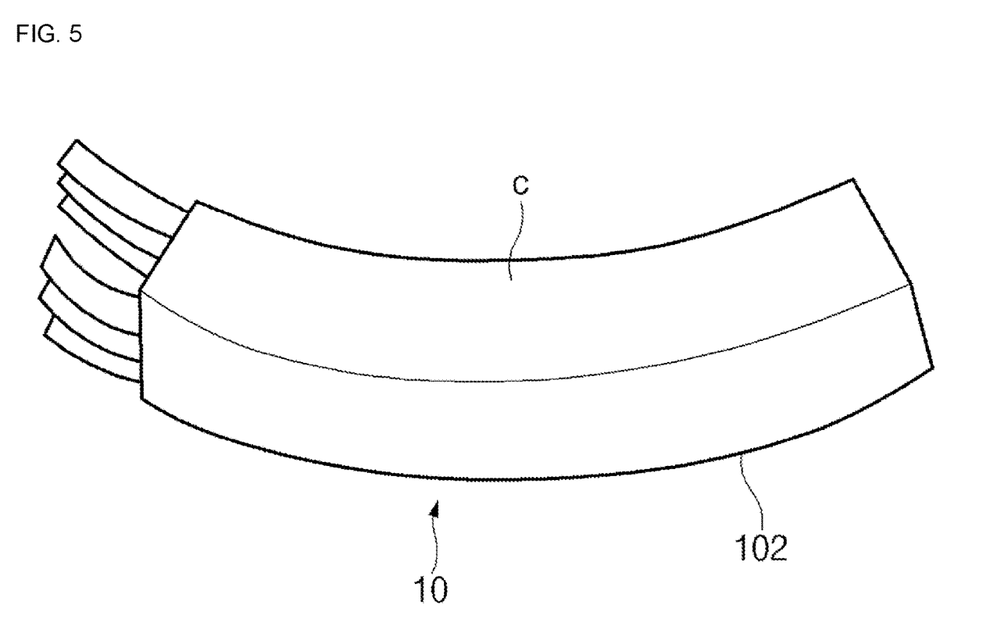
FIG. 5 is a perspective view of an electrode assembly having a curved surface according to an example of the present invention.

FIG. 5 is a perspective view of an electrode assembly having a curved surface according to an example of the present invention.

As illustrated in FIG. 5, a curved surface C having a predetermined curvature radius may be formed on the electrode assembly 10 according to an example of the present invention. As illustrated in FIG. 5, the curved surface C may be formed on all of top and bottom surfaces of the electrode assembly 10. Alternatively, the curved surface C may be formed on only the top or bottom surface of the electrode assembly 10.

Here, the winding separator 102 surrounding the circumference of the electrode stack may be configured to surround the curved surface C formed on the top or bottom surface of the electrode stack. According to the present invention, the winding separator 102 may surround the curved surface C of the electrode stack to maintain a relative distance between the radical units (or the bi-cells) adjacent to each other. Thus, delamination between the radical units may be prevented. Alternatively, according to the present invention, the winding separator 102 may surround the curved surface C of the electrode stack to prevent the delamination between the electrode and the separator, which constitute the electrode stack and are adjacent to each other, from occurring.

In the electrode assembly having the curved surface, it is difficult to manufacture an electrode assembly on which a curved surface having a relatively small curvature radius (i.e., a curved surface that is largely curved) is formed. To manufacture the electrode assembly on which a curved surface having a small curvature radius is formed, the electrode assembly or the electrode stack has to be pressed by using a pressing press on which a curved surface is formed. This is done for a reason in which it is difficult to maintain the curved surface formed on the electrode assembly because the delamination between the electrode and the separator, which constitute the electrode stack, frequently occurs when the curvature radius is small.

As described above, the winding separator 102 is configured to prevent the delamination from occurring. Particularly, the winding separator 102 may effectively prevent the delamination between the electrode and the separator from occurring in the electrode assembly on which the curved surface having a small curvature radius is formed.

Hereinafter, a method for manufacturing an electrode assembly according to an example of the present invention will be described with reference to the accompanying drawings.

Method for Manufacturing Electrode Assembly

A method for manufacturing an electrode assembly according to an example of the present invention may include a first step of preparing a plurality of radical units manufactured by stacking an electrode and a separator; a second step of manufacturing an electrode stack by stacking the plurality of radical units, and a third step of pressing an outer surface of the electrode stack to manufacture an electrode assembly on which a curved surface having a curvature radius is formed on the electrode stack.

In the method for manufacturing the electrode assembly according to an example of the present invention, if the sum of bonding force remaining after the third step among bonding force between the electrode and the separator as bonding force generated before the third step is defined as F1, the sum of force by which the electrode and the separator are spread again so that shapes of the electrode and the separator return to shapes before the electrode stack is pressed in the third step is defined as R, and the sum of bonding force additionally generated between the electrode and the separator within the electrode assembly by the third step is defined as F2, the expression: F1+R≤F2 may be satisfied.

According to the process of manufacturing the electrode assembly, the curved surface formed on the electrode assembly in the third step may be spread again as time elapses. Whether the curved surface formed on the electrode assembly is maintained as it is may be determined by the relationship between the force acting on the curved surface of the electrode assembly.

First, the force (hereinafter, referred to as 'restoring force') by which the curved surface formed on the electrode assembly is spread again may be largely divided into the sum F1' of bonding force interacting between the electrode and the separator which are generated before the third step and the sum R of the force by which the electrode and the separator are spread again so that the shapes of the electrode and the separator return to their original shapes before the electrode stack is pressed in the third step. That is, the force F1' may be force that is generated in the step in which the plurality of radical units are manufactured, and then, the plurality of radical units are stacked. Here, since the force is generated when the electrode and the separator are in the flat state, the force may act as force that interferes with the maintenance of the curved shape. Thus, as the intensities of the force F1' and R increase, the curved surface formed on the electrode assembly tends to return to its original shape.

On the other hand, the force (hereinafter, referred to 'curved surface forming force') for maintaining the shape of the curved surface formed in the third step may be regarded as the sum F2 of the bonding force that is additionally generated between the electrode and the separator within the electrode assembly in the third step.

However, a portion of the force F1' may be lost in the third step. That is, a portion of the boding force between the electrode and the separator, which is generated in before the third step may be lost by a temperature and a pressure, which are applied to the electrode assembly while the curved surface is formed on the electrode assembly. Thus, the sum of the bonding force, which remains after the third step, of the bonding force between the electrode and the separator as the bonding force generated before the third step may be less than the force F1'. Hereinafter, the sum of the bonding force, which remains after the third step, of the bonding force between the electrode and the separator as the bonding force generated before the third step will be called F1.

In order to maintain the shape of the curved surface of the electrode assembly formed in the third step, after the third step, the curved surface forming force has to be greater than the restoring force. Thus, according to the present invention, since the shape of the curved surface formed on the electrode assembly may be maintained as the force F2 is larger than the sum of F1 and R in the step of manufacturing the electrode assembly.

The method for manufacturing the electrode assembly according to an example of the present invention may further include a winding step of surrounding a circumference of the electrode stack by using a winding separator that is separated from the separator constituting the electrode stack to maintain a relative distance between the radical units within the electrode stack. Here, the winding step may be performed between the second step and the third step. Also, in the winding step, the winding separator may surround the entire circumference of the electrode stack.

When the method for manufacturing the electrode assembly according to the present invention further comprises the winding step, the curved surface forming force, i.e., F2 may be divided again into two forces.

That is, the force F2 may be divided into the sum e1 of the bonding force between the electrode and the separator within the electrode stack, which is additionally generated in the third step, and the sum e2 of the bonding force between the electrode stack and the winding separator, which is additionally generated in the third step. That is, a portion (i.e., the force F1) of the bonding force between the electrode and the separator within the electrode stack may act as the restoring force, and the other portion of the bonding force may act as the curved surface forming force according to the step of generating the bonding force.

In the first step, the electrode and the separator may be bonded to each other at a temperature of 30° C. to 70° C.

When the electrode and the separator are bonded to each other at a temperature less than 30° C. in the first step, the electrode and the separator may not be properly bonded to each other within the electrode stack in cause a phenomenon in which the electrode and the separator are delaminated in the third step. On the other hand, when the electrode and the separator are bonded to each other at a temperature exceeding 70° C., the bonding between the electrode and the separator within the electrode stack is too strong (i.e., the force F1 is too strong), the curved surface formed on the electrode assembly in the third step may be spread again. Preferably, in the first step, the electrode and the separator within the electrode stack may be bonded to each other at a temperature of 30° C. to 55° C., more preferably, a temperature of 35° C. to 45° C.

The curved surface C of the electrode stack 100, which is formed in the third step, may have a curvature radius of 70 mm to 200 mm.

As described above, the present invention may be for manufacturing the electrode assembly having a curvature radius less than that of the electrode assembly according to the related art. Particularly, the inventor of the present invention have found through experimentation that it is impossible to manufacture the electrode assembly having a curvature radius less than 200 mm or it takes a remarkably long time to manufacture the electrode assembly having the curvature radius less than 200 mm according to the related art. In the third step, the curved surface C of the electrode stack 100 may have a curvature radius of 70 mm to 150 mm, preferably, in the third step, the curved surface C of the electrode stack 100 may have a curvature radius of 80 mm to 130 mm. More preferably, the curved surface C of the electrode stack 100 may have a curvature radius of 85 mm to 95 mm.

In the third step, the electrode stack may be pressed at a pressure of 400 kgf/cm$^2$ to 800 kgf/cm$^2$.

When the pressure of pressing the electrode stack in the third step is less than 400 kgf/cm$^2$, the bonding between the electrode and the separator within the electrode assembly while the curved surface is formed is not sufficiently strong (i.e., the force F2 is too weak), the curved surface formed in the electrode assembly may be spread again. On the other hand, when the pressure of pressing the electrode stack in the third step exceeds 800 kgf/cm$^2$, the electrode and the separator may be damaged. Preferably, the pressure of pressing the electrode stack in the third step may range of 500 kgf/cm$^2$ to 700 kgf/cm$^2$, more preferably, range of 550 kgf/cm$^2$ to 650 kgf/cm$^2$.

In the third step, the electrode stack may be pressed at a temperature of 60° C. to 100° C.

When the electrode stack is pressed at a temperature less than 60° C. in the third step, the bonding between the electrode and the separator within the electrode assembly while the curved surface is formed is not sufficiently strong (i.e., the force F2 is too weak), the curved surface formed in the electrode assembly may be spread again. On the other hand, when the electrode stack is pressed at a temperature exceeding 100° C. in the third step, the electrode and the separator may be damaged. Preferably, in the third step, the electrode stack may be pressed at a temperature of 70° C. to 90° C., more preferably, a temperature of 75° C. to 85° C.

In the third step, a time taken to press the electrode stack may be 30 seconds to 190 seconds.

When the electrode stack is pressed for a time less than 30 seconds in the third step, the bonding between the electrode and the separator within the electrode assembly while the curved surface is formed is not sufficiently strong (i.e., the force F2 is too weak), the curved surface formed in the electrode assembly may be spread again. On the other hand, when the electrode stack is pressed for a time exceeding 190 seconds in the third step, the electrode and the separator may be damaged to significantly deteriorate productivity of the electrode assembly. Preferably, in the third step, the electrode stack may be pressed for a time of seconds to 100 seconds, more preferably, a time of 50 seconds to 70 seconds.

The radical unit of the electrode stack may include a first bi-cell in which positive electrodes are respectively provided on both the outermost surfaces and a second bi-cell in which negative electrodes are respectively provided on both the outermost surfaces. Also, in the second step, the first bi-cell and the second bi-cell may be alternately stacked. Here, an insertion separator that is a separate separator may be disposed between the first bi-cell and the second bi-cell. Here, the first bi-cell may have a structure in which the positive electrode, the separator, the negative electrode, the separator, and the positive electrode are disposed, and the second bi-cell may have a structure in which the negative electrode, the separator, the positive electrode, the separator, and the negative electrode are disposed.

Also, in the second step, the first bi-cell may be disposed on each of both the outermost surfaces of the electrode stack. Here, a single-sided positive electrode on which a positive electrode active material is applied to only one surface of a collector may be disposed on an outer surface of both the outermost surfaces of the first bi-cell, which is disposed on both the outermost surfaces of the electrode stack. Also, in the second step, eight first bi-cells and seven second bi-cells may be provided in the electrode stack.

Although the curvature radius of the curved surface is maintained as it is immediately after the curved surface is formed on the electrode assembly, as time elapses, the curvature radius of the curved surface formed on the electrode assembly may increase. This phenomenon may occur more particularly at both ends of the electrode assembly rather than at a center of the electrode assembly. This phenomenon may cause a difference between the curvature radius of the central portion of the electrode assembly and the curvature radius of curvature of each of both the ends to interfere with the formation of the curved surface having a constant curvature radius.

Thus, in the third step of the method for manufacturing the electrode assembly according to the present invention, the curvature radius of each of both the ends of the curved surface, on which the curvature radius is formed on the electrode stack, may be less 2% to 8% than the curvature radius of the central portion of the curved surface, on which the curvature radius is formed. In this case, as time elapses, even if the curvature radius of the curved surface is changed somewhat, the difference between the curvature radius at the center of the curved surface and the curvature radius at each of both the ends of the curved surface may be minimized.

When the pressure of pressing the electrode stack in the third step is too small, since the bonding between the electrode and the separator within the electrode assembly is not sufficiently strong during the curved surface formation process, the curved surface formed on the electrode assembly may be spread again. Thus, the pressure of pressing the radical unit while the radical unit is stacked in the second step may be relatively less than that of pressing the electrode stack in the third step. The pressure of pressing the radical unit while the radical unit is stacked in the second step may be equal to or less than 10%, preferably 5% of the pressure of pressing the electrode stack in the third step.

As described above, the electrode assembly according to an example of the present invention may be manufactured by surrounding the circumference of the electrode stack by using the winding separator after the plurality of radical units are sequentially stacked and bonded to each other to manufacture the electrode stack. The electrode assembly manufactured through the above-described manufacturing method may have following advantages when compared to a folding type electrode assembly manufactured by folding a separation film after a plurality of radical units are disposed on the separation film.

In a case of a stack and folding type electrode assembly, the stack and folding type electrode may be manufactured by folding a separation film after a radical unit is disposed on the separation film. In this process, since the separation film and the radical unit largely moves, the radical unit may be delaminated from the separation film in the process of folding the separation film, or the delamination between an electrode and a separator within the radical unit may easily occur. Thus, to manufacture the stack and folding type electrode assembly, bonding force between the electrode and the separator within the radical unit in the process of manufacturing the radical unit and bonding force between the radical unit and the separation film in the folding process may be necessarily strong.

However, when the bonding force between the electrode and the separator or between the radical unit and the separation film is strong before the curved surface is formed, it may be difficult to form the curved surface on the electrode assembly. That is, even though the electrode assembly is pressed by using the pressing press having the curved surface to form the curved surface on the electrode assembly, the bonding force between the electrode and the separator within the radical unit and the bonding force between the radical unit and the separation film before the curved surface is formed may act as a kind of restoring force to prevent the curved surface from being maintained. This tendency becomes stronger as the curvature radius of the curved surface formed on the electrode assembly becomes smaller (i.e., the curved surface is largely curved). Thus, the stack and folding type electrode assembly may have a problem in that the curvature radius of the curved surface is limited.

On the other hand, in the case of the electrode assembly according to an example of the present invention, since the plurality of radical units are stacked to manufacture the electrode assembly, the movement of the radical unit is small in the process of manufacturing the electrode assembly. Thus, the strong bonding force between the electrode and the separator within the radical unit is unnecessary. Thus, even if the curved surface is formed by pressing the electrode assembly through the pressing press, since the restoring force due to the bonding force inside the electrode assembly is relatively small, the curvature radius of the curved surface formed on the electrode assembly may be relatively freely formed.

Embodiment 1

Eight first bi-cells, each of which has a structure in which a positive electrode, a separator, a negative electrode, a separator, and a positive electrode are alternately stacked, were prepared, seven second bi-cells, each of which has a structure in which a negative electrode, a separator, a positive electrode, a separator, and a negative electrode are alternately stacked, were prepared, and fourteen separators were prepared. Two first bi-cells of the eight first bi-cells were prepared so that a single-sided electrode is disposed on each of both the outermost surfaces thereof. Each of all the electrodes and the separators had a rectangular sheet shape.

While the first bi-cell and the second bi-cell are manufactured, the electrode and the separator were pressed at a temperature of 40° C. to bond the electrode and the separator to each other.

Each of the positive electrodes used in Embodiment 1 had a horizontal length of 32.26 mm and a vertical length of 56.25 mm. Each of the negative electrodes used in Embodiment 1 had a horizontal length of 33.96 mm and a vertical length of 57.95 mm. Each of the separators used in Embodiment 1 had a horizontal length of 35.46 mm and a vertical length of 60 mm.

Thereafter, the first bi-cells, the separators, and the second bi-cells were sequentially stacked in order of the first bi-cell, the separator, the second bi-cell, and the first bi-cell from a lower side to manufacture an electrode stack having a structure in which the first bi-cell, the separator, and the second bi-cell are bonded to each other (i.e., the electrode stack has a structure in which the first bi-cell is disposed on each of both the outermost surfaces). Here, the first bi-cell disposed on each of both the outermost surfaces of the electrode stack was the first bi-cell provided with the single-sided positive electrode.

Thereafter, a separator that is separated from the separator constituting the electrode stack was prepared to surround a circumference of the electrode stack by one turn, and then, both ends of the separate separator were bonded to each other.

Thereafter, an electrode assembly on which a curved surface having a curvature radius of 89 mm is formed by pressing the electrode stack through the pressing press was manufactured.

The electrode assembly was pressed at a pressing temperature of 80° C., a pressing pressure of 600 kgf/cm², and a pressing time of 60 seconds by the pressing press.

Embodiment 2

The manufacturing of the electrode assembly by using the eight first bi-cells, the seven second bi-cells, and fourteen separators and the structure of the electrode stack were the same as those in Embodiment 1. Also, the process in which a separator that is separated from the separator constituting the electrode stack is prepared along a circumference of the electrode stack, the separate separator surrounds the circumference of the electrode stack by one turn, and both the ends of the separate separator are bonded to each other was also the same as that in Embodiment 1. Also, the horizontal and vertical lengths of the electrode and the separator were the same as those in Embodiment 1.

While the first bi-cell and the second bi-cell are manufactured, the electrode and the separator were pressed at a temperature of 50° C. to bond the electrode and the separator to each other.

Also, in Embodiment 2, an electrode assembly on which a curved surface having a curvature radius of 108 mm is formed by pressing the electrode stack through the Embodiment 2 pressing press was manufactured.

The electrode assembly was pressed at a pressing temperature of 80° C., a pressing pressure of 600 kgf/cm², and a pressing time of 60 seconds by the pressing press.

Embodiment 3

The manufacturing of the electrode assembly by using the eight first bi-cells, the seven second bi-cells, and fourteen separators and the structure of the electrode stack were the same as those in Embodiment 1. Also, the process in which a separator that is separated from the separator constituting the electrode stack is prepared along a circumference of the electrode stack, the separate separator surrounds the circumference of the electrode stack by one turn, and both the ends of the separate separator are bonded to each other was also the same as that in Embodiment 1. Also, the horizontal and vertical lengths of the electrode and the separator were the same as those in Embodiment 1.

While the first bi-cell and the second bi-cell are manufactured, the electrode and the separator were pressed at a temperature of 60° C. to bond the electrode and the separator to each other.

Also, in Embodiment 3, an electrode assembly on which a curved surface having a curvature radius of 125 mm is formed by pressing the electrode stack through the Embodiment 2 pressing press was manufactured.

The electrode assembly was pressed at a pressing temperature of 80° C., a pressing pressure of 600 kgf/cm², and a pressing time of 60 seconds by the pressing press.

Comparative Example 1

Eight first bi-cells, each of which has a structure in which a positive electrode, a separator, a negative electrode, a separator, and a positive electrode are alternately stacked, were prepared, seven second bi-cells, each of which has a structure in which a negative electrode, a separator, a positive electrode, a separator, and a negative electrode are alternately stacked, were prepared, and one separator was prepared.

Each of All the electrodes and the separators had a rectangular sheet shape, and a width and length of each of the electrode and separator were the same as those in Embodiment 1.

Thereafter, the first bi-cells and the second bi-cells were alternately disposed adjacent to each other from one end to the other end of the separation film on the separation film. Here, the first bi-cell was disposed on the one end of the separation film, and the second bi-cell was disposed at a distance that is spaced by a width from the first bi-cell in a direction of the other end of the separation film.

Thereafter, the separation film was folded to manufacture an electrode assembly. An interval at which the separation film is folded was the same as the width of each of the first bi-cell and the second bi-cell. When the separation film is folded, the electrode assembly was pressed at a temperature of 70° C.

Thereafter, the electrode assembly was pressed by using a pressing roller to manufacture a plurality of electrode assemblies on which curved surfaces having curvature radii different from each other are formed.

The electrode assembly was pressed at a pressing temperature of 80° C., a pressing pressure of 600 kgf/cm², and a pressing time of 60 seconds by the pressing press.

Comparative Example 2

An electrode assembly was manufactured through the same manner as that according to Comparative Example 1 except that the electrode assembly is pressed for 320 seconds by using the pressing roller.

Comparative Example 3

An electrode assembly was manufactured through the same manner as that according to Comparative Example 1 except that the electrode assembly is pressed for 900 seconds by using the pressing roller.

Experimental Example

Whether delamination occurs between the electrode and the separator, which constitute each of the electrode assemblies manufactured according to Embodiment and Comparative Example, was confirmed through naked eyes.

As the result of the confirmation, no lamination phenomenon was observed in all of the electrode assemblies manufactured in Embodiments 1 to 3.

On the other hand, the delamination phenomenon was observed in a portion of the electrode assemblies manufactured by Comparative Example. That is, in Comparative Example 1, the delamination was observed in the electrode assembly having a curvature radius less than 310 mm, and in Comparative Example 2, the delamination was observed in the electrode assembly having a curvature radius less than 208 mm. Also, in Comparative Example 3, the delamination phenomenon was observed in the electrode assembly having a curvature radius less than 175 mm.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for manufacturing an electrode assembly, the method comprising:
a first step of preparing a plurality of flat radical units, each of which is manufactured by alternately stacking an electrode and a separator;
a second step of stacking the plurality of flat radical units to manufacture an electrode stack; and
a third step of directly pressing an outer surface of the electrode stack to manufacture an electrode assembly having a curved surface having a curvature radius,
wherein, after the third step, the following expression is satisfied:

$F1+R \leq F2$, wherein F1 is defined as a sum of bonding force remaining after the third step among bonding force between the electrode and the separator as bonding force generated before the third step,
wherein R is defined as a sum of force by which the electrode and the separator are spread again so that shapes of the electrode and the separator return to shapes before the electrode stack is pressed in the third step,
wherein F2 is defined as a sum of bonding force additionally generated between the electrode and the separator within the electrode assembly by the third step, and
wherein, in the first step, the electrode and the separator of the flat radical unit are provided in plurality and are all bonded to each other at a temperature of 30° C. to 70° C.

2. The method of claim 1, further comprising a winding step of surrounding at least a portion of a circumference of the electrode stack by using a winding separator that is distinct from the separator constituting the electrode stack to maintain a relative distance between the flat radical units within the electrode stack,
wherein the winding step is performed between the second step and the third step, and
wherein the force F2 comprises a sum (e1) of a bonding force between the electrode and the separator within the electrode stack, which is additionally generated in the third step, and a sum (e2) of a bonding force between the electrode stack and the winding separator, which is additionally generated in the third step.

3. The method of claim 2, wherein, in the winding step, the winding separator surrounds an entire circumference of the electrode stack.

4. The method of claim 1, wherein the curvature radius ranges from 70 mm to 200 mm.

5. The method of claim 1, wherein, in the third step, the electrode stack is pressed at a pressure of 400 kgf/cm² to 800 kgf/cm².

6. The method of claim 1, wherein, in the third step, the electrode stack is pressed at a temperature of 60° C. to 100° C.

7. The method of claim 1, wherein the plurality of flat radical units comprise:
a first bi-cell defined by a positive electrode among the electrodes disposed on opposite outermost surfaces of the first bi-cell; and
a second bi-cell defined by a negative electrode among the electrodes is disposed on opposite outermost surfaces of the second bi-cell,
wherein, in the second step, the first bi-cell and the second bi-cell are alternately stacked, and
an insertion separator that is a separate separator from the separators in the flat radical units is disposed between adjacent first and second bi-cells.

8. The method of claim 7, wherein the first bi-cell has a structure in which a positive electrode, a separator, a negative electrode, a separator, and a positive electrode are disposed, and
the second bi-cell has a structure in which a negative electrode, a separator, a positive electrode, a separator, and a negative electrode are disposed.

9. The method of claim 7, wherein, in the second step, first bi-cells are disposed on opposite outermost surfaces of the electrode stack, and
each of the outermost positive electrodes of the first bi-cells disposed on the opposite outermost surfaces of the electrode stack is a single-sided positive electrode on which a positive electrode active material is applied to only one surface of a collector.

10. The method of claim 7, wherein, in the second step, eight first bi-cells are provided in the electrode stack, and seven second bi-cells are provided in the electrode stack.

11. The method of claim 1, wherein, in the third step, an end of the curved surface has a curvature radius 2 to 8% less than that of a central portion of the curved surface.

12. The method of claim 1, wherein, in the first step, the electrode and the separator of the flat radical unit are all bonded to each other at a temperature of 35° C. to 45° C.

13. A method for manufacturing an electrode assembly, the method comprising:
 a first step of preparing a plurality of flat radical units, each of which is manufactured by alternately stacking an electrode and a separator;
 a second step of stacking the plurality of flat radical units to manufacture an electrode stack;
 a winding step of surrounding at least a portion of a circumference of the electrode stack by using a winding separator that is distinct from the separator constituting the electrode stack to maintain a relative distance between the flat radical units within the electrode stack; and
 a third step of directly pressing an outer surface of the electrode stack to manufacture an electrode assembly having a curved surface having a curvature radius,
 wherein, in the first step, the electrode and the separator of the flat radical unit are provided in plurality and are all bonded to each other at a temperature of 30° C. to 70° C., and
 wherein, in the third step, the electrode stack is pressed at a temperature of 60° C. to 100° C.

14. The method of claim 13, wherein the curvature radius ranges from 70 mm to 200 mm.

15. The method of claim 13, wherein, when the flat radical units are stacked in the second step, a pressure is applied to the flat radical units that is equal to or less than 10% of a pressure of pressing the electrode stack in the third step.

16. The method of claim 13, wherein, in the first step, the electrode and the separator of the flat radical unit are all bonded to each other at a temperature of 35° C. to 45° C.

17. The method of claim 13, wherein, in the third step, an end of the curved surface has a curvature radius 2 to 8% less than that of a central portion of the curved surface.

\* \* \* \* \*